United States Patent [19]

Kirschner

[11] 4,435,799
[45] Mar. 6, 1984

[54] DISC RECORD PLAYER HAVING SHUTOFF SWITCH ACTUATING APPARATUS

[75] Inventor: Thomas F. Kirschner, Indianapolis, Ind.

[73] Assignee: RCA Corporation, New York, N.Y.

[21] Appl. No.: 374,463

[22] Filed: May 3, 1982

[51] Int. Cl.³ ............... G11B 19/10; G11B 17/00; G11B 1/00
[52] U.S. Cl. ................................. 369/77.2; 369/79; 369/243
[58] Field of Search ............... 369/75, 77, 243, 79

[56] References Cited

U.S. PATENT DOCUMENTS

| 4,191,381 | 3/1980 | Stave | 369/215 |
| 4,352,174 | 9/1982 | Tajima et al. | 369/77.2 |
| 4,384,352 | 5/1983 | Saito et al. | 369/77.2 |

FOREIGN PATENT DOCUMENTS 2069745  5/1981  United Kingdom ........ 369/77.2

Primary Examiner—Steven L. Stephan
Attorney, Agent, or Firm—E. M. Whitacre; J. S. Tripoli; D. A. Kulkarni

[57] ABSTRACT

The player has a record handling mechanism which consists of a sequencing cam for coordinating the operations of a record lifting finger and a set of record receiving pads. To transfer a record from the record receiving pads to a turntable for playback, the record lifting finger is raised through a slot in the turntable to lift the record to a position above the receiving pads, the receiving pads are retracted out of the way, and then the record lifting finger is withdrawn to a location beneath the turntable to deposit the record on the turntable. To transfer the record back to the record receiving pads for retrieval, the sequence of operations is basically reversed. It is desirable to hold the registration between the turntable slot and the record lifting finger when the player is turned off. To this end a shutoff switch actuating mechanism is provided. When the player is turned off, the sequencing cam is driven in a direction that raises the record lifting finger through the turntable slot. The sequencing cam has a rib which engages and deflects a pivotally-mounted shutoff switch actuating lever to operate a shutoff switch to turn off a motor driving the sequencing cam. The location of the rib on the sequencing cam is such that the shutoff switch is actuated when the record lifting finger is occupying the turntable slot to lock the turntable in place. The shutoff switch actuating lever is retracted when a record is inside the player to prevent the rib from engaging the actuating lever to allow the normal record transfer operation without hindrance from the shutoff switch actuating mechanism.

5 Claims, 15 Drawing Figures

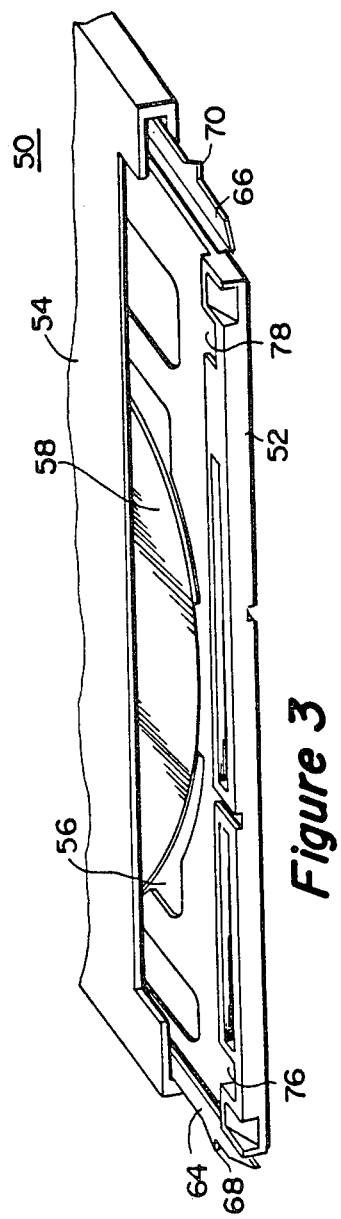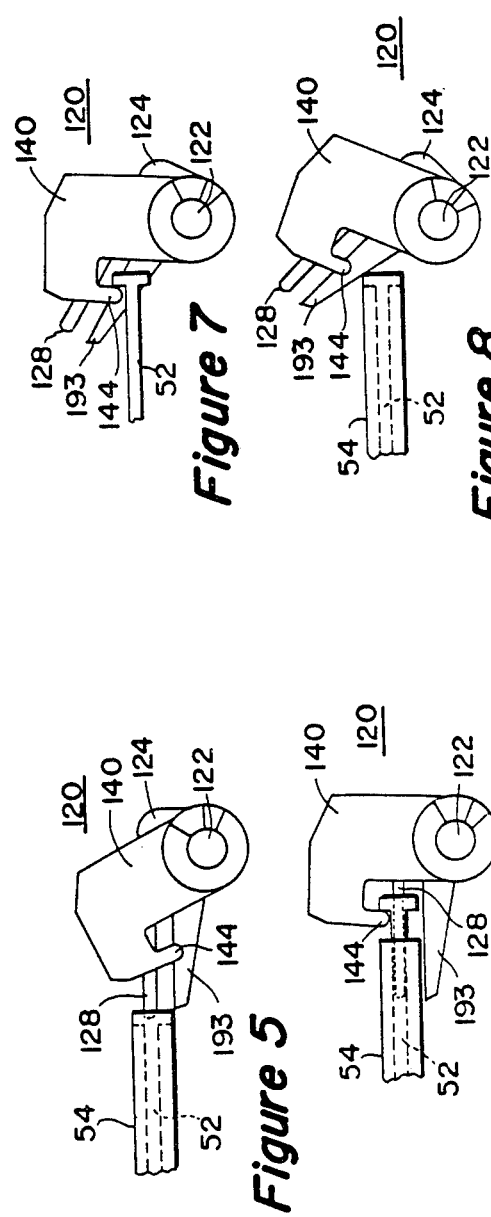

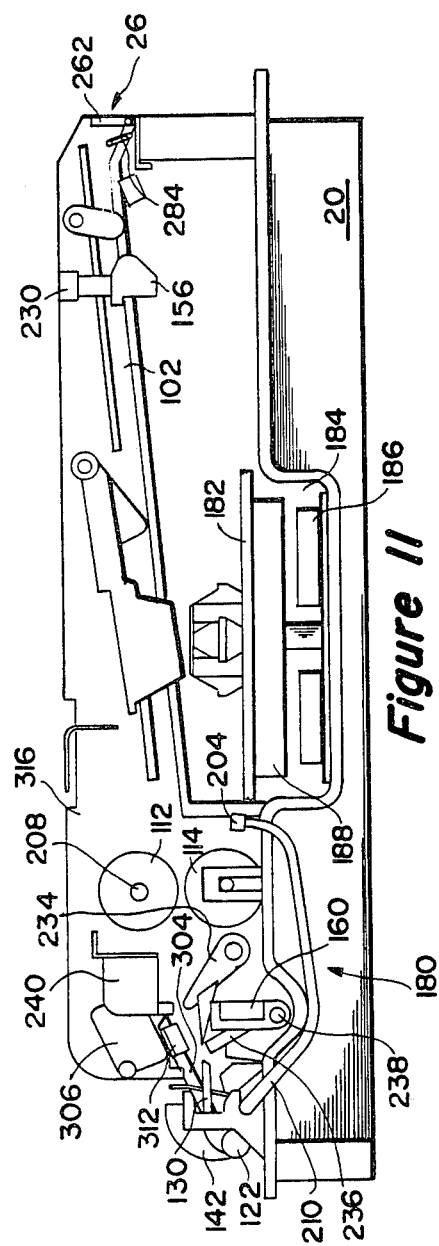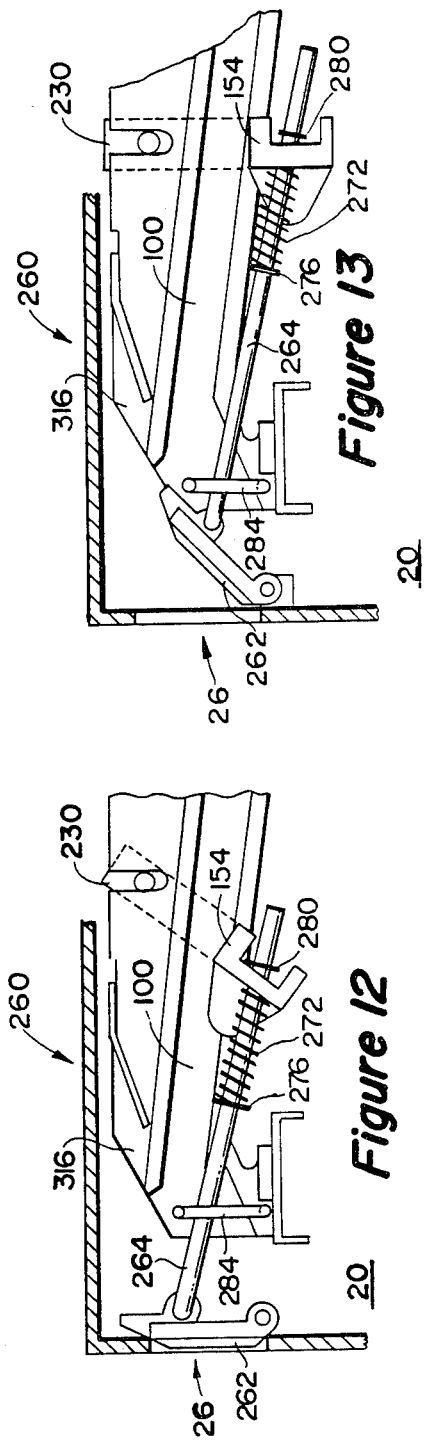

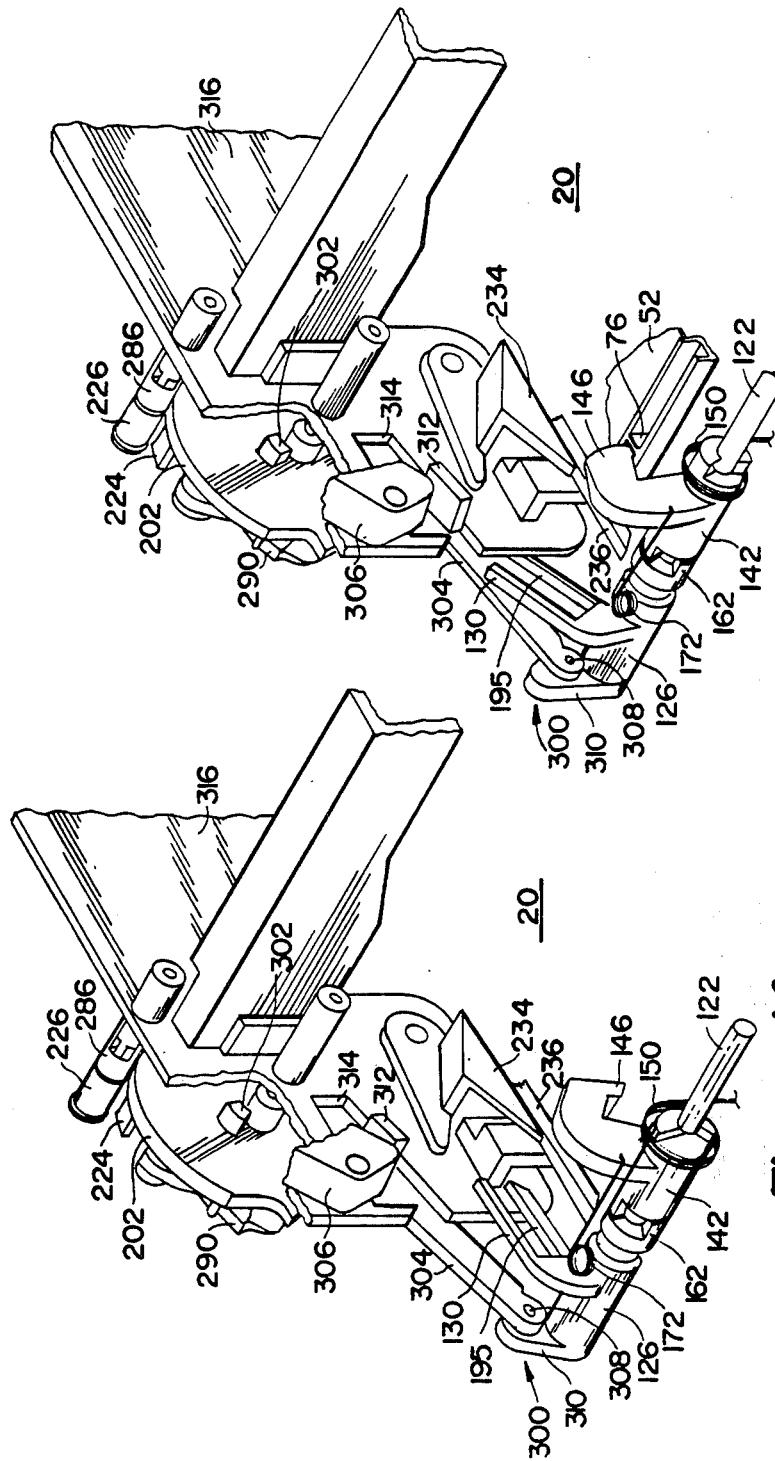

DISC RECORD PLAYER HAVING SHUTOFF SWITCH ACTUATING APPARATUS

This invention generally relates to a disc playback system, and more particulary, to a disc record player suitable for use with a record enclosed in a protective caddy.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver.

It is beneficial to enclose a video record in a caddy which comprises a record retaining spine removably located within an outer sleeve. The record retaining spine has an opening in which a record is received to form a record/spine assembly. The record retaining spine is provided with a pair of spaced apart locking fingers disposed at the opposite edges thereof to releasably secure the spine to the sleeve. For record loading, a full caddy is inserted into an input slot provided in the player along a pair of caddy guide rails. A record extraction mechanism disposed in the player removes the record/spine assembly from the sleeve when the sleeve is withdrawn to leave the record/spine assembly inside the player resting on a set of record receiving pads. The retained record is then transferred by a record handling mechanism to a turntable for playback. For record retrieval, the record is transferred back to the receiving pads, and an empty jacket is reinserted into the player to recapture the record/spine assembly.

A concurrently-filed, commonly-assigned U.S. patent application of the same inventor, entitled "RECORD EXTRACTION MECHANISM FOR DISC PLAYER" describes an apparatus for removing the record/spine assembly from the sleeve and replacing the assembly back in the sleeve without the need for touching the enclosed record.

Another concurrently-filed, commonly-assigned U.S. patent application of Hughes, entitled "DISC PLAYER HAVING RECORD HANDLING APPARATUS", describes a mechanism for transporting a retained record between the record receiving pads and the turntable. The Hughes record transfer mechanism includes a sequencing cam which is rotatably mounted in the player for motion between a load position and a play position to synchronize the operations of a record lifting finger and a set of retractable spring-loaded record receiving pads situated above the turntable. The player is equipped with a reversible function motor to selectively drive the sequencing cam between the two modes thereof. As the sequencing cam goes from the load position to the play position, the record lifting finger is raised through a slot in the turntable to pick up the record resting on the receiving pads to a position above the receiving pads, the receiving pads are retracted out of the way, and the record lifting finger is then withdrawn to a position beneath the turntable to achieve the transfer of the record to the turntable. The record retaining spine stays on the receiving pads.

To return the record back to the receiving pads after playback, the turntable is stopped at a position where the slot therein overlies the record lifting finger. The direction of the sequencing cam is then reversed to lift the record lifting finger through the slot to elevate the record to its position above the receiving pads, the receiving pads are advanced to their original positions, and then the record lifting finger is lowered to deposit the record back on the receiving pads to redefine the record/spine assembly. An empty sleeve is reinserted into the player to retrieve the record/spine assembly. The user may then insert a new caddy into the player or turn off the player.

It is desirable to lock the turntable in place when the player is turned off to avoid the need for realigning the turntable slot with the record lifting finger. To this end, a shutoff switch actuating mechanism is provided in accordance with the subject invention. The subject shutoff switch actuating mechanism consists of an actuating member movably mounted in the player for motion between an advanced position and a retracted position, respectively, in response to the absence of and the presence of a record/spine assembly in the player. The location of the shutoff switch actuating member is such that the actuating member is disposed in and out of the path of a tab arranged on the sequencing cam when the actuating member respectively occupies the advanced position and the retracted position during the motion of the sequencing cam between the two locations thereof. When the actuating member is occupying the retracted position in response to the presence of a record/spine assembly in the player, the tab on the sequencing cam clears the shutoff switch actuating member to allow the transfer of a retained record between the receiving pads and the turntable without hindrance from the shutoff switch actuating mechanism. On the other hand, the tab on the sequencing cam engages and deflects the actuating member to operate a shutoff switch to turn off the function motor, when the actuating member is occupying the advanced position in response to the absence of a record/spine assembly in the player during motion of the sequencing cam away from the load position. The location of the tab on the sequencing cam is such that it operates the shutoff switch at a point where the record lifting finger is occupying the turntable slot in order to hold the turntable/finger alignment when the player is turned off.

In accordance with another feature of the invention, the player includes a door, coupled to the front receiving pads, for closing the caddy input slot when the front receiving pads are retracted. The tab on the sequencing cam further serves to stop the sequencing cam as it moves away from the load position at a point where the front receiving pads are retracted and the caddy door is closed when the player is switched off.

In the Drawings:

FIGS. 2 and 3 show a video disc caddy suitable for use with the present shutoff switch actuating apparatus in the practice of the subject invention;

FIGS. 5-8 illustrate the operation of a record extraction mechanism for loading and unloading a record into and from the player;

FIG. 11 shows the side view of the record handling mechanism of FIGS. 9 and 10;

FIGS. 12 and 13 illustrate a caddy door mechanism with the caddy door shown respectively in the closed and partly open position; and FIGS. 14 and 15 show the subject shutoff switch actuating apparatus.

Figure 1:
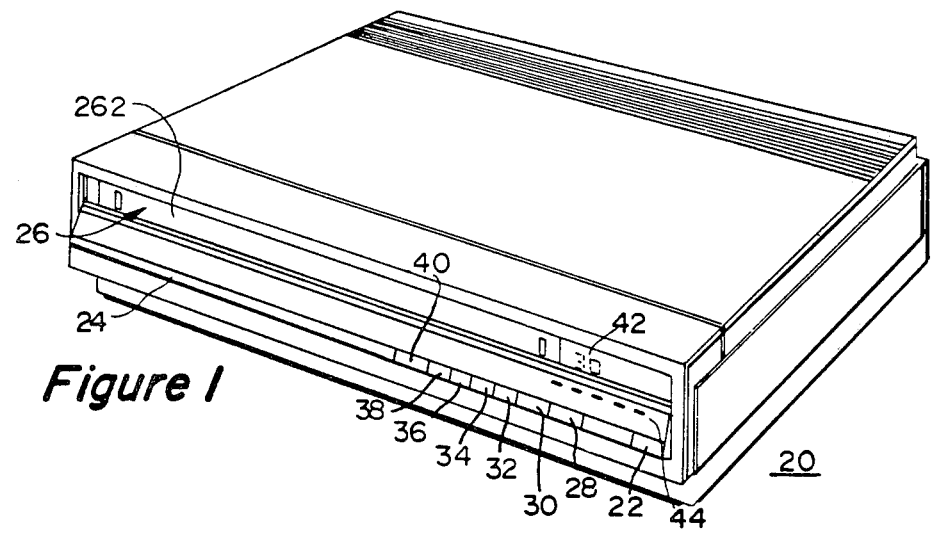
FIG. 1 illustrates a video disc player incorporating a shutoff switch actuating apparatus in accordance with the instant invention.
Figure 2:
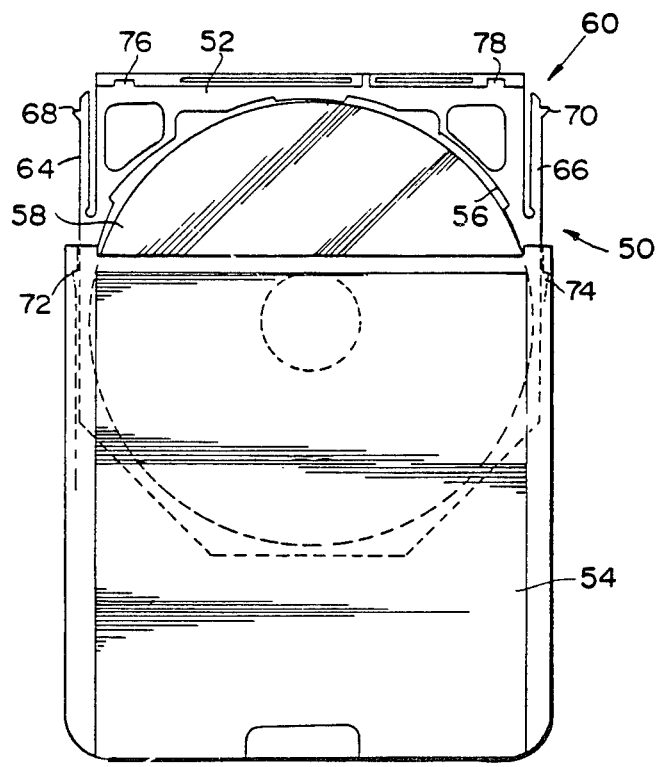

Shown in FIG. 1 is a video disc player 20 incorporating the present shutoff switch actuating mechanism. To play a disc, the player is turned on by pressing the "POWER" button 22 located on the front panel 24. A loaded record caddy, illustrated in FIGS. 2 and 3, is inserted into the player through a caddy input slot 26, and the caddy sleeve is then extracted leaving the enclosed record/spine assembly inside the player. The record is automatically deposited on the turntable, and played back through a conventional television receiver. At any point during playback, the viewer can reject the remainder of the record by depressing the "REJECT" button 28, or interrupt the program by activating the "PAUSE" button 30. Buttons 32 and 34 permit a non-visual rapid scan of the record in either direction. Buttons 36 and 38 allow a visual rapid search of the record in both directions. The player has a "CHANNEL A/B" button 40 to select any one of two audio channels in the event of a bilingual program disc. An LED indicator 42 shows the elapsed playing time. Various player functions—such as SIDE 1-2, CHANNEL A/B, STEREO—are indicated by a plurality of light indicators 44.

The caddy 50, depicted in FIGS. 2 and 3, consists of a planar record retaining spine 52 removably enclosed in a flat outer sleeve 54. The retaining spine 52 has an opening 56 in which a centrally-apertured record 58 is received forming a record/spine assembly 60. Integrally molded with the spine 52 are spine locking fingers 64 and 66 for releasably securing the spine 52 in its sleeve 54. The spine locking fingers 64 and 66 are fitted with protruding elements 68 and 70 which are received in the respective recesses 72 and 74 provided in the sleeve 54 to hold the spine 52 in place. The spine 52 has cutouts 76 and 78 in which the respective spine latching members of a record extraction mechanism are received to secure the spine to the player for reasons explained later.

To load a record, the caddy 50 is manually inserted into the player through the input slot 26. The player has a set of side rails 100 and 102 for guiding the caddy insertion. When the caddy 50 actuates a caddy sense switch 104, a function motor 106 is turned on. The function motor 106 drives a set of caddy drive rollers 108, 110, 112 and 114 which, in turn, pull the caddy in.

The player is provided with a record extraction mechanism 120, indicated in FIGS. 5-8, to extract the enclosed record/spine assembly from the caddy without the need for touching the record. The record extraction mechanism 120 comprises a cross shaft 122 pivotally mounted near the back end of the player at right angles to, and offset from, the caddy insertion path. Disposed at the opposite ends of the offset shaft 122, and fixedly secured thereto, are a pair of spine releasing members 124 and 126. The spine releasing members 124 and 126 are each equipped with respective wedge-like portions 128 and 130 which are arranged in the caddy insertion path as shown in FIG. 5. When the caddy 50 is inserted into the player, the leading edge of the caddy is transported to the rear of the player, and the wedge-like portions 128 and 130 protrude into the sleeve 54 to deflect the spine locking fingers 64 and 66 in order to release the spine 52 from the sleeve.

The record extraction mechanism 120 further includes a pair of spine latching members 140 and 142 mounted freely on the cross shaft 122 adjacent to the respective spine releasing members 124 and 126. When the caddy 50 is inserted into the player, it engages the hook-like portions 144 and 146 of the spine latching members 140 and 142 to deflect the latching members from their initial positions, shown in FIG. 5, to their respective intermediate positions shown in FIG. 6. A pair of coil springs 148 and 150, disposed about the offset shaft 122, drive the hook-like portions 144 and 146 into the slots 76 and 78 in the spine 52, in the manner illustrated in FIG. 6, to lock the spine to the player.

When the caddy 50 reaches the fully inserted position, it activates a microswitch 152 located at the back end of the player to reverse the function motor 106 to drive the sleeve 54 out until it clears the drive rollers 108, 110, 112 and 114. The sleeve 54 is then manually extracted, leaving the record/spine assembly 60 inside the player resting on a set of spring-loaded, retractable record receiving pads 154, 156, 158 and 160. When the sleeve 54 is withdrawn, a pair of springs 170 and 172, connecting the spine releasing members 124 and 126 and the spine latching members 140 and 142 together, rotate the spine releasing members, fixedly-mounted on the cross shaft 122, away from the spine 52 to the respective interim positions thereof as can be seen from FIG. 7.

A record handling mechanism 180 is then activated to transfer the retained record 58 from the receiving pads 154, 156, 158 and 160 to a turntable 182, and a turntable motor 184, shown in FIG. 11, is turned on to initiate the playback sequence. The turntable drive motor 184 consists of a stator 186 and a ring-shaped magnetic rotor 188 attached to the underside of the turntable 182 as shown in FIG. 11. A carriage 190, which houses a stylus cartridge 192, is then advanced by a carriage drive motor 194 to a position over the turntable 182, and a stylus 196, located in the pickup cartridge, is lowered onto the record 58. During playback, the motor 194 drives the carriage 190 to follow the pickup stylus 196. At the end of the playback, the carriage drive motor 194 returns the carriage to its off-record starting position. The record 58 is then returned to the receiving pads 154, 156, 158 and 160 by the record handling mechanism 180 to redefine the record/spine assembly 60. The operation of the record handling mechanism 180 will be described later.

To recapture the record/spine assembly 60 disposed on the receiving pads 154, 156, 158 and 160, the caddy sleeve 54 is reinserted into the player. When the sleeve 54 engages the caddy sense switch 104, the function motor 106 drives the rollers 108, 110, 112 and 114 in a direction that draws in the caddy sleeve. As the caddy sleeve 54 reaches the fully inserted position in the player, its front edge engages and deflects the portions 193 and 195 disposed on the respective spine releasing members 124 and 126 as shown in FIG. 8. When the spine releasing members 124 and 126 are rotated by the sleeve 54, tabs disposed thereon, in turn, press against the respective spine latching members 140 and 142 to lift the hook-like portions 144 and 146 from the slots 76 and 78 in the spine 52 to release the spine. A tab disposed on the spine releasing member 126 is identified by a numeral 162 in FIGS. 14 and 15. Simultaneously, the spine locking fingers 64 and 66 lock the spine 52 in its sleeve 54.

The function motor 106 is reversed when the sleeve 54 operates the reverse switch 152 to again drive the caddy 50 out until it clears the drive rollers 108, 110, 112 and 114. The caddy 50 is then manually removed from the player. The springs 148 and 150 reset the spine latching members 140 and 142 to their respective initial positions when the caddy is retrieved from the player. The spine latching members 140 and 142, in turn, restore the spine releasing members 124 and 126 at respective original positions thereof.

The record handling mechanism 180 will now be described in conjunction with FIGS. 9–11. The record handling mechanism 180 includes a sequencing cam 202 for synchronizing the actions of a record lifting finger 204 and the record receiving pads 154, 156, 158 and 160 to achieve the transfer of a retained record between the receiving pads and the turntable 182. The function motor 106, which drives the caddy transport rollers 108, 110, 112 and 114, also serves to selectively drive the sequencing cam 202 in the appropriate direction through a gear pulley 206 mounted on a shaft 208 driven by the function motor.

The record lifting finger 204 is disposed at one end of U-shaped member 210 pivotally mounted near the back end of the player. The other end 212 of the U-shaped member 210 is slidably received in a slotted element 214 disposed on the sequencing cam 202. As the sequencing cam 202 turns counter-clockwise from the load position, shown in FIG. 9, to the play position, indicated in FIG. 10, the record lifting finger 204 is first raised through one of the turntable slots 216, 218, 220 and 222, to a position above the record receiving pads 154, 156, 158 and 160, and then retracted to a position underneath the turntable 182.

Disposed on the sequencing cam 202 on the front surface thereof is an arcuate rib 224 subject to engagement with a pivotally-mounted front pad actuating tab 226 which is linked by means of a connecting rod 228 to a swingably-mounted bracket 230 carrying the front receiving pads 154 and 156. During the motion of the sequencing cam 202 from the load position to the play position, the arcuate rib 224 engages and deflects the front pad actuating tab 226 to, in turn, rotate the front receiving pads 154 and 156 out of the way.

The sequencing cam 202 further has an arcuate rib 232 arranged on its back side for engagement with a rear pad actuating tab 234. When the sequencing cam 202 rotates anticlockwise, the arcuate rib 232 contacts and deflects the rear pad actuating tab 234. The rear pad actuating tab 234, in turn, engages and displaces a lever 236 fixedly mounted on a shaft 238 carrying the rear receiving pads 158 and 160, so that the rear receiving pads are retracted to allow the passage of the record to the turntable 182.

Figure 9:
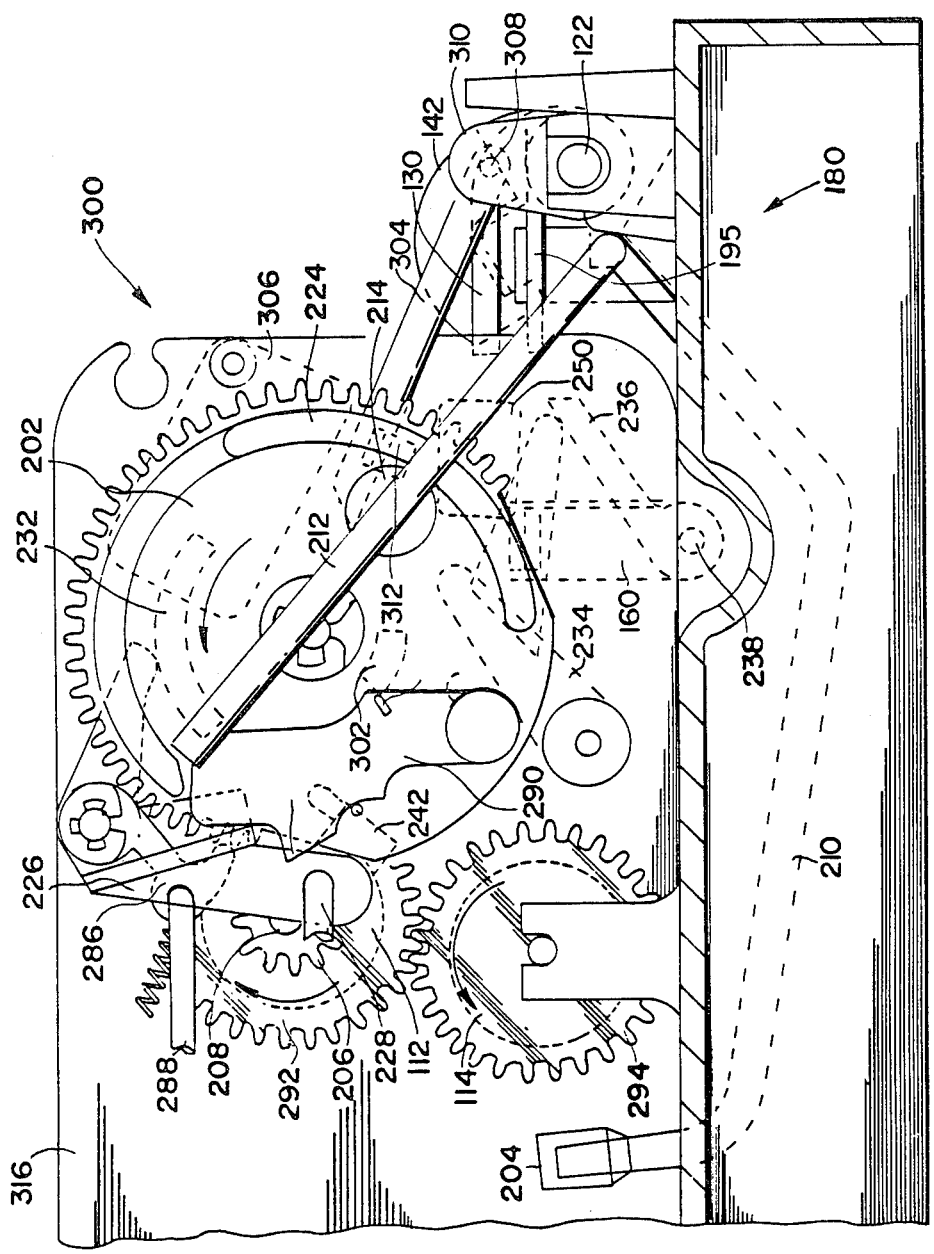
FIGS. 9 and 10 depict a record handling mechanism, disposed respectively in the load mode and the play mode, for transferring a disc between the record receiving pads and the turntable.
Figure 10:
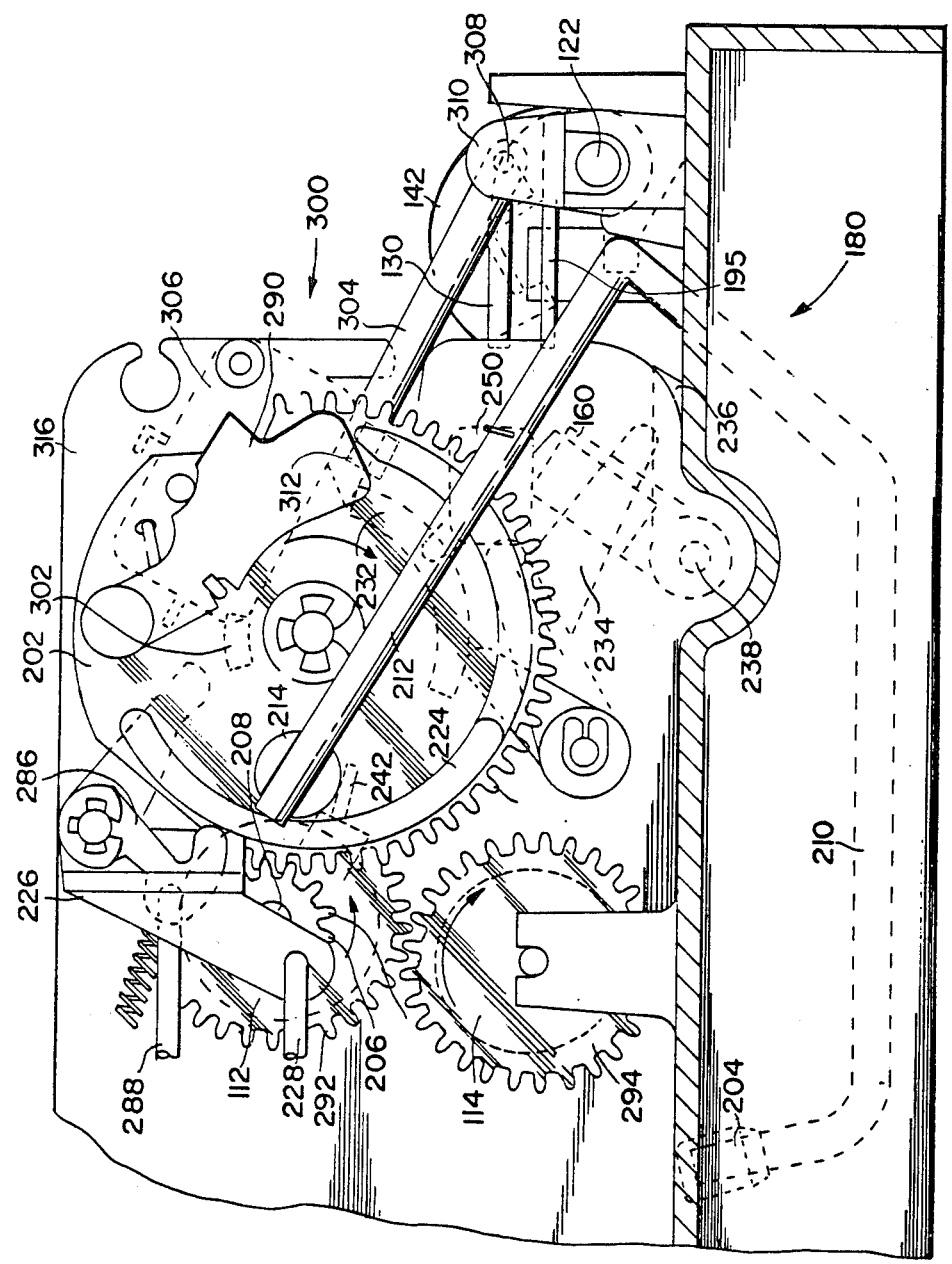

To transfer a retained record from the record receiving pads 154, 156, 158 and 160 to the turntable 182, the function motor 106 drives the sequencing cam 202 from FIG. 9 load position to FIG. 10 play position. The sequence of operations is as follows:

The record lifting finger 204 is raised through one of the turntable slots 216, 218, 220 and 222 to lift a record, resting on the record receiving pads 154, 156, 158 and 160, to a position against a pair of stops 240 and 241, shown in FIG. 11, located above the rear receiving pads.

The front and rear receiving pads 154, 156, 158 and 160 are retracted out of the way.

The record lifting finger 204 is withdrawn to a position beneath the turntable 182 to deposit the record on the turntable.

When the sequencing cam 202 reaches the play position indicated in FIG. 10, the slotted element 214 disposed thereon operates a play switch 242 to turn off the function motor 106 to stop the rotation of the sequencing cam and to initiate the playback sequence.

After playback, the stator 186 of the turntable motor 184 coacts with the annular magnetic rotor 188 secured to the underside of the turntable 182 to locate one of the turntable slots 216, 218, 220 and 222 above the record lifting finger 204 as the turntable is brought to a complete halt. To transfer a turntable-supported record back to the record receiving pads 154, 156, 158 and 160, the function motor 106 is activated to drive the sequencing cam 202 in the clockwise direction from FIG. 10 play position to FIG. 9 load position. The chronology of events is set forth below:

The record lifting finger 204 is again raised through one of the turntable slots 216, 218, 220 and 222 to elevate the record, placed on the turntable 182 to the position against the stop 240 above the record receiving pads 154, 156, 158 and 160.

The front and rear receiving pads 154, 156, 158 and 160 are then restored to their initial positions. A spring 244 resets the rear receiving pads 158 and 160. The front receiving pads 154 and 156 are returned to their original positions by a pair of springs 246 and 248.

The record lifting finger 204 is then retracted to a position below the record receiving pads 154, 156, 158 and 160 to position the record on the receiving pads to redefine the record/spine assembly.

When the sequencing cam 202 arrives at the load position, the slotted element 214 operates a load switch 250 to shut off the function motor 106.

An empty sleeve is then reinserted into the player to retrieve the record/spine assembly disposed on the record receiving pads 154, 156, 158 and 160.

Figure 4:
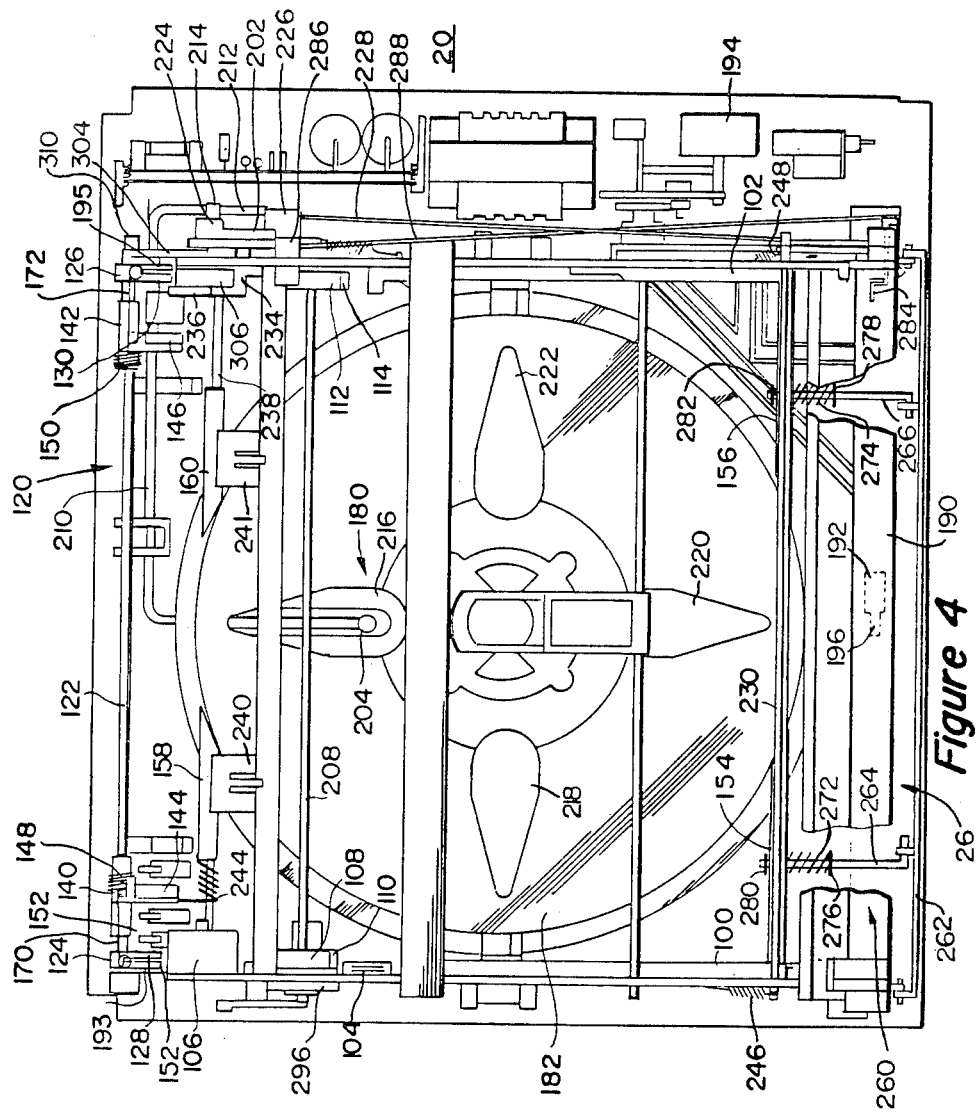
FIG. 4 is a top view of the FIG. 1 video disc player with its lid removed to expose the underlying details.

The caddy door mechanism 260 will now be described with reference to FIGS. 4, 12 and 13. The caddy input slot is fitted with a pivotally-mounted door 262. The caddy door 262 is coupled to the front receiving pads 154 and 156 by means of a pair of coupling rods 264 and 266. One end of each of the coupling rods 264 and 266 is swingably mounted to the caddy door 262. The coupling rods 264 and 266 are slidably received in the respective front receiving pads 154 and 156. A set of springs 272 and 274 are disposed between a pair of retainers 276 and 278 secured to the respective coupling rods 264 and 266 and the respective front receiving pads 154 and 156. Another set of retainers 280 and 282 are disposed on the respective coupling rods 264 and 266 on the other side of the front receiving pads 154 and 156. When the front receiving pads 154 and 156 are retracted (e.g., when the player is in FIG. 10 play mode), the caddy door 262 closes the input slot 26 as indicated in FIG. 12. As the front receiving pads 154 and 156 are advanced (e.g., when the player goes toward FIG. 9 load mode), the caddy input door 262 is partially opened in the manner illustrated in FIG. 13. When a caddy is inserted through the input slot 26 to load a record in the player, it swings the caddy door 262 out of the way. As the caddy door 262 turns open, the coupling rods 264 and 266 slide forward through the openings in the front receiving pads 154 and 156 to allow the caddy to go in.

Located behind the caddy door 262 is a caddy sense member 284 as can be seen from FIG. 11. When a caddy is inserted into the input slot 26 to load a record into the player, it deflects the caddy door 262, which, in turn, displaces the caddy sense member 284. The caddy sense member 284 is coupled to a pivotally-mounted pawl actuating tab 286 via a connecting rod 288 as illustrated in FIG. 4. When the player is disposed in FIG. 9 load mode, the pawl actuating tab 286 is subject to engagement with a pawl 290 swingably-mounted on the sequencing cam 202. The caddy sense member 284 serves to hold back the pawl 290 to prevent an extension disposed on the gear pulley 206 from engaging the pawl while a caddy is inside the player. Upon withdrawal of the sleeve from the player, the caddy sense member 284 is released, which, in turn, frees the pawl 290 for engagement with the extension disposed on the gear pulley 206. The initial engagement of the extension with the pawl 290 brings into engagement the teeth on the gear pulley 206 with the teeth on the sequencing cam 202 to start the rotation of the sequencing cam from FIG. 9 load position to FIG. 10 play position. As previously indicated, the counter-clockwise rotation of the sequencing cam 202 effects the transfer of a record resting on the receiving pads 154, 156, 158 and 160 to the turntable 182 for playback. The caddy sense member 284 functions to defer the record transfer sequence until the sleeve is extracted from the player. When the sequencing cam 202 reaches the play position, indicated in FIG. 10, it activates the play switch 242 to stop the function motor 106 and to initiate the playback operations as explained above.

The caddy drive roller 114 is driven by a pair of gear pulleys 292 and 294 shown in FIGS. 9 and 10. Another set of gear pulleys, indicated by numeral 296 in FIG. 4, drives the other caddy drive roller 110.

As previously indicated, it is desirable to hold the turntable 182 in place to preserve the registration between the turntable 182 and the record lifting finger 204 when the player is turned off. It is also desirable to close the caddy door 262 when the player is switched off. To this end, the player is provided with a shutoff switch actuating apparatus 300 in accordance with the principles of the present invention.

When the player is turned off by pressing the power button 22 after extracting the caddy from the player, the function motor 106 is started to drive the sequencing cam 202 from FIG. 9 load position to FIG. 10 play position. As the sequencing cam 202 rotates toward the play position, an arcuate rib 302 disposed on the back side of the sequencing cam in the manner shown in FIG. 14 engages and deflects a pivotally-mounted shutoff switch actuating lever 304. The shutoff switch actuating lever 304, in turn, operates a shutoff switch 306 to turn off the function motor 106. As the sequencing cam 202 turns away from FIG. 9 load position, the record lifting finger 204 is raised through an appropriate one of the turntable slots 216, 218, 220 and 222 to lock the turntable 182 in place, and the front receiving pads 154 and 156 are retracted to close the caddy door 262. The location of the arcuate rib 302 on the sequencing cam 202 is such that the function motor 106 is turned off when the record lifting finger 204 is occupying one of the turntable slots 216, 218, 220 and 222, and the caddy door 262 is closed shut.

The shutoff switch actuating lever 304 has an opening at one end in which a loose-fitting pin 308, disposed on an extension 310 integrally molded with the spine releasing member 126, is received. Disposed at the other end of the shutoff switch actuating lever 204 is a pad 312 which is slidably received in an elongated cutout 314 provided in the player housing 316. The shutoff switch actuating lever 304 occupies an advanced position, shown in FIG. 14, and a retracted position, indicated in FIG. 15, respectively in response to the motion of the spine releasing member 126 between the initial position, illustrated in FIGS. 5 and 6, and the deflected position, depicted in FIGS. 7 and 8.

As previously noted, when a caddy is inserted into the player, the front edge of the spine engages and deflects the spine latching members 140 and 142 in the manner indicated in FIG. 15. The spine latching members 140 and 142, in turn, displace the respective spine releasing members 124 and 126 when the sleeve is extracted from the player. As the spine releasing member 126 turns away from the retained spine, the extension 310 disposed on the spine releasing member 126 pulls back the shutoff switch actuating lever 304 to prevent its engagement with the arcuate rib 302 during the motion of the sequencing cam 202 between FIG. 9 load position and FIG. 10 play position.

The subject shutoff switch actuating mechanism 300, thus, serves to lock the turntable 182 in place and to shut the caddy door 262 when the player is turned off.

What is claimed is:

1. In a record player for use with a record enclosed in a protective caddy; said caddy consisting of a record retaining spine removably located within an outer sleeve; said retaining spine having an opening in which said record is received forming a record/spine assembly; said player having an input slot near the front end thereof through which said caddy is inserted to load a record therein; said player having a record extraction mechanism for removing said record/spine assembly from said sleeve and retaining it in said player on a set of front and rear receiving pads when said sleeve is extracted from said player after the insertion of a full caddy therein; said player including a turntable for rotatably supporting a retained record during playback; an empty sleeve being reinserted into said player to recapture said record/spine assembly; a shutoff switch actuating apparatus comprising:

a shutoff switch;

a cam member movably mounted in said player for motion between a first location and a second location;

means coupled to said shutoff switch for driving said cam member between said first location and said second location;

a shutoff switch actuating member movably mounted in said player for motion between a first position and a second position, respectively, in response to the absence of and the presence of a record/spine assembly in said player;

the location of said actuating member being such that said actuating member is disposed in and out of the path of a portion arranged on said cam member when said actuating member respectively occupies said first position and said second position during said motion of said cam member between said locations; and said portion on said cam member engaging and deflecting said actuating member to activate said shutoff switch to turn off said cam member driving means when said actuating member is occupying said first position in response to the absence of said record/spine assembly in said player during said motion of said cam member away from said first location.

2. The apparatus as defined in claim 1 for use with said player wherein said player further includes a mechanism responsive to said cam member for transferring a retained record between said receiving pads and said turntable; said record transferring mechanism transporting said retained record from said receiving pads to said turntable for playback during said motion of said cam member from said first location to said second location; said record transferring mechanism transporting said retained record from said turntable back to said receiving pads for record retrieval as said cam member moves from said second location to said first location; said retained spine locating said actuating member at said second position thereof to prevent said portion on said cam member from engaging said actuating member during motion of said cam member between said first location and said second location.

3. The apparatus as defined in claim 2 for use with said player wherein said record transferring mechanism includes a record lifting finger, coupled to said cam member, which passes through a slot in said turntable to achieve said record transfer between said receiving pads and said turntable; the location of said portion on said cam member being such that said portion engages said actuating member disposed in said first position thereof in response to the absence of a record/spine assembly in said player during said motion of said cam member away from said first location to operate said shutoff switch when said record lifting finger is occupying said turntable slot to lock said turntable in place.

4. The apparatus as defined in claim 3 for use with said player wherein said receiving pads are located above said turntable; wherein said receiving pads are retracted in response to the motion of said cam member from said first location to said second location to allow passage of a retained record to said turntable; wherein said player includes a door, coupled to said front receiving pads, for closing said caddy input slot when said front receiving pads are retracted; said portion on said cam member further serving to engage said actuating member occupying said first position thereof in response to the absence of a record/spine assembly in said player during said motion of said cam member away from said first location to actuate said shutoff switch to stop said cam member driving means when said front receiving pads are retracted and said caddy door is closed.

5. The apparatus as defined in claim 1 for use with said player wherein said record extraction mechanism releasing said spine from said sleeve and locking said spine to said player when a full caddy is inserted into said player so that when said sleeve is removed from said player, said record/spine assembly is retained inside resting on said receiving pads; said record extraction mechanism comprising a pair of spaced-apart spine releasing members fixedly mounted on a rotatable cross shaft located near the rear end of said player; said spine releasing members protruding into said sleeve to deflect a pair of oppositely disposed spine locking fingers to free said spine from said sleeve upon said insertion of said caddy into said player; said record extraction mechanism further including a pair of spaced-apart spine latching members freely mounted on said cross shaft for engaging said spine during said caddy insertion to lock said spine to said player; said record extraction mechanism further having means for yieldably coupling said spine releasing members and said latching members together so that when said sleeve is withdrawn from said player, said spine releasing members follow said spine latching fingers to a deflected position, whereby said cross shaft is rotated away from an initial position thereof; said shutoff switch actuating apparatus further having a lever, coupled to said actuating member, fixedly mounted on said cross shaft for motion therewith in response to said rotation of said shaft when said sleeve is withdrawn from said player leaving said record/spine assembly therein; said lever serving to displace said actuating member to said second position thereof to prevent said cam member from operating said shutoff switch while said record/spine assembly is occupying said player.

* * * * *